United States Patent
Kneringer et al.

[11] Patent Number: 5,976,217
[45] Date of Patent: Nov. 2, 1999

[54] METHOD FOR THE REDUCTION OF METALLIC COMPOUNDS

[75] Inventors: Günter Kneringer; Wolfgang Köck; Joachim Resch, all of Ruette, Austria

[73] Assignee: Schwarzkopf Technologies, Corporation, New York, N.Y.

[21] Appl. No.: 08/860,113

[22] PCT Filed: Oct. 29, 1996

[86] PCT No.: PCT/AT96/00207

§ 371 Date: Aug. 28, 1997

§ 102(e) Date: Aug. 28, 1997

[87] PCT Pub. No.: WO97/16275

PCT Pub. Date: May 9, 1997

[30] Foreign Application Priority Data

Oct. 31, 1995 [AT] Austria ................................. 1796/95

[51] Int. Cl.[6] .................................................. B22F 9/22
[52] U.S. Cl. ............................... 75/353; 75/363; 75/369
[58] Field of Search .............................. 75/343, 353, 363, 75/366, 369; 423/53, 606

[56] References Cited

U.S. PATENT DOCUMENTS

| | | | |
|---|---|---|---|
| 3,234,007 | 2/1966 | Blocher, Jr. et al. ...................... | 75/366 |
| 4,859,236 | 8/1989 | Patrician et al. ......................... | 420/429 |
| 5,125,964 | 6/1992 | Buerkel et al. ........................... | 75/366 |

FOREIGN PATENT DOCUMENTS

| | | | |
|---|---|---|---|
| 0197271 | 4/1989 | European Pat. Off. . | |
| 48191 | 8/1969 | German Dem. Rep. . | |
| 286312 | 1/1992 | German Dem. Rep. . | |
| 1583912 | 10/1970 | Germany . | |
| 2122499 | 3/1978 | Germany . | |
| 2716082 | 10/1978 | Germany . | |
| 4127567 | 3/1992 | Germany . | |
| 4214723 | 11/1993 | Germany . | |
| 59-113104 | 6/1984 | Japan ....................................... | 75/369 |
| 63-45310 | 2/1988 | Japan ....................................... | 75/369 |
| 441769 | 1/1968 | Switzerland . | |
| 9203581 | 3/1992 | WIPO . | |
| 9302962 | 2/1993 | WIPO . | |

Primary Examiner—George Wyszomierski
Attorney, Agent, or Firm—Morgan & Finnegan, L.L.P.

[57] ABSTRACT

The preparation of suitable powdered metal is important in powder metallurgy technology. To date, powdered metals, in particular refractory metals, have been produced using very time-consuming and, consequently, costly methods for the reduction of metallic compounds, e.g. by reducing solid metallic compounds to powdered metal in fluidized bed ovens or pusher-type furnaces. In the present invention, powdered metallic compounds are reduced by retaining the solid phase as a continuous process by particles passing through a reaction chamber to predetermined orbits. The process lasts on average 0.4 to 60 s, and the level of completeness of the process is at least 90%.

12 Claims, 1 Drawing Sheet

METHOD FOR THE REDUCTION OF METALLIC COMPOUNDS

BACKGROUND OF THE INVENTION

The invention concerns a method for the chemical reduction, consisting of one or more stages of reaction, of powdered metal compounds as the material to be reduced, to powdered metal or to powdered metal compounds at a lower oxidation state than the predetermined final product, in a temperature controlled reaction chamber with input and output openings for the material to be reduced, for the gaseous reducing medium and, alternatively, for the carrier gas. The method is particularly suitable for the reduction of refractory powdered metal oxide into powdered metal, for example, the reduction of en oxide to tungsten, or even of molybdenum oxide to molybdenum.

Until now, the methods of powder metallurgy have dominated the manufacture of refractory metals and their further processing. As a result, the quality of the powdered metal, particularly the purity and the grain structure, has a decisive influence on the quality of the powder-metallurgical products produced from it.

The specialist has therefore always ascribed great importance to the production steps of metal extraction, which produce pure powdered metal directly. This especially concerns the reduction of powdered metal oxides of refractory metals, for example $W_4O_{11}$ or $MoO_3$ to pure metallic powder in one or more stages of reduction.

It is therefore noteworthy, that these oxides have predominantly been reduced in pusher-type furnaces for decades, for reasons unchanged up to the present. For this processing, the powdered oxides are smeared into a thin layer in tablet-like ceramics or metal seers and directed (pushed) step by step, at an established rate for several hours through a high temple pusher-type furnaces with zones of different temperature and different atmospheric conditions. As a rule, hydrogen gas is introduced as the reducing agent. The processing times and therefor the reduction times are around $10^3$–$2\times10^4$ seconds. The specific throughput, measured as tons of material to be produced per unit volume ($m^3$) of the reaction chamber and hour, is approximately 0.04 for pusher-type furnaces.

Another known method for reducing these types of metallic compounds which is seldom used in practice, is the so led rotary kiln method Here the charging stock of the material to be reduced moves in a rotary kiln tilted slimly from the horizontal. The processing times are comparable to that of pusher-type kilns. Here, adequate furnace dwelling or reduction times are likewise in the range of $10^3$–$10^4$ seconds and the specific throughput is approximately 0.055 tons per cubic meter and hour.

Both of these methods have a disadvantage which has been known for a long time, namely the small specific throughput of the powder to be reduced, relative to the size of the installation. The source of the small specific throughput is the restricted access of the reducing gas to the powder surface of the material to be reduced.

To overcome the discussed disadvantages of rotary kilns and pusher-type kilns, it has been proposed to undertake the reduction in a fluidized bed oven In this method, the metal compound to be reduced is brought as powdered charging stock into a temperature controlled reaction chamber on a metal grating, By the reducing gas, mixed with a carrier gas if necessary, flows from below through the material to be reduced, which is positioned on the grating, thereby stirring up the material, bringing it into a quasi-fluid gas particle phase, and reducing it to powdered metal in contact with the same.

Yet even in this method, the dwelling time of the material to be reduced in the reaction chamber for adequate homogeneous reduction of the particles is $10$–$10^4$ seconds. Accordingly, the specific throughput of the material to be reduced is around one power of ten above that of pusher-type and rotary kilns.

The sources of these unsatisfactorily long dwelling or reaction times are the partial reoxidation of already reduced particles in the charging stock, and the unavoidable formation of individual time-varying "channels" in the bulk material through which the gas flows. The materials in the zones bordering these channels is only partially, if at all, supplied with reducing gas and reduced.

The publication by A. V. Savin "On the practice and theory of reduction of tungsten oxides", Izvestiya Rossuskoi Akademii Nauk. Metally, No. 4, pages 22–26, 1993, English version appearing under the publication number ISSN: 0568-5303, published in 1993 by Allerton Press. Inc., 150 Fifth Ave., New York, N.Y. 10011; deals with the metallurgical events and with the kinetics of the reduction of tungsten oxide. In this context it gives practical laboratory experiments to help with the reduction of powdered tungsten oxide. For this purpose, loose tungsten oxide powder was introduced from above into a vertical tube, 250–300 mm long, heated to 1,200° C., over a small hopper, and traveled through this tube in free fall within 0.25 seconds. There was a reducing gas in the tube whose influence on the passage time of the powder through the tube could be disregarded. The reduction of tungsten oxide occurred at a moderate rate, so that the process had to be repeated several times with the same powder, in order to obtain reaction data which appeared to support the model over the individual reaction events. In an alternative experimental arrangement, a film of $WO_3$ was placed on a wire which was brought into a reducing atmosphere, and heated for approximately 1 second by a current passage. This resulted in a reduction of the oxide that escaped precise quantification.

In the professional world, the concept of "cyclone" has evolved for a reaction chamber, externally similar to the fluidized-bed chamber, for carrying out reactions of chemical materials. In contrast to the procedure in a fluidized-bed chamber, the solid, gaseous, and occasionally even liquid materials which are provided for a reaction in a cyclone, often premixed and swirled many times, individually or together, are continuously fed into the upper area of the reaction chamber with mass throughput, as a whole vertical, or blown in a prescribed direction. The materials introduced in this way move under the effects of the gravitational and centrifugal forces as well as the flow conditions of the gases in the reaction space. They react in the desired way and manner, and exit the chamber, mainly at the end of the reaction chamber opposite the entrance, as solid, liquid, or gaseous end products. Gaseous end products are released at the reaction chamber's upper end, from case to case, depending on the flow conditions.

The origination of a flow field of the reaction material with axial, radial, and high tangential velocities is common to all cyclone-like reaction chambers. As a rule, very large relative velocities between solids and gases appear. Large velocity gradients produce high intensities of turbulence, thereby effecting high rates of thermal and material diffusion.

These types of cyclone reactors are useful for the pyrolysis of sawdust: J. Lede, F. Verzaro, B. Antoine, J. Villermaux, "Flash Pyrolysis of Wood in a Cyclone Reactor", Chem. Eng. Proc. 20 (1986), pages 309–317; J.

Cousins, W. Robinson, "Gasification of Sawdust in an air blown cyclone Gasifier", Ind. Eng. Chem. Process Des. Dev. 24 (1985), pages 1281–1287; or even for the burning of slag and sewage sludge: T. Murakami, et al, "Characteristics of Melting Process for Sewage Sludge", Wat. Sci, Tech. 23 (1991), pages 2019–2028.

Finally, cyclones are also described for exothermal metallurgical processes, e.g. for melting copper and lead concentrations, and copper concentrations containing zinc (DE 33 41 154 Al; A Lange, "Das Schwebeschmelzen und andere leistungsintensive Prozesse" [Flash-smelting and other Production Intensive Processes], Erzmetall 13 (1960), pages 151–159).

It is nevertheless common to all metallurgical processes conducted in cyclones, that the reaction materials are introduced as gaseous and solid particles, and the reduced metals leave the cyclone molten, i.e. they are collected as smelt in a settling kiln at the reaction chamber's lower outlet.

The shape and chemical structure of all materials participating in the reaction are determining factors for the constructive arrangements actually tried, within broad bounds, and the process parameters used in the cyclone in practice.

A reaction chamber corresponding to the U.S. Pat. No. 4,555,387 is used for a procedural step for man, molybdenum trioxide from a slag containing molybdenum sulphide. It corresponds to a cyclone insofar as powdered molybdenum sulphide is introduced into a reaction chamber from above together with a reaction gas, and these pass through on a prescribed path. Slags containing molybdenum di-sulphide are added to the reaction chamber separately in particle form together with oxygen as the reaction gas and with additional carrier gases. There, they are brought to the reaction temperature in the so-called flame front. The end products leaving the reaction space are volatile molybdenum trioxide, liquid slag, and residual gas.

SUMMARY OF THE INVENTION

An object of the method in accordance with the present invention is the chemical reduction of powdered metallic compounds, including refractory metals in particular, as solid-gas reactions to powdered end products, especially to powdered metal, with the objective of substantially decreasing the reduction time in the reaction chamber in comparison to the current technically realized state of technology, consequently raising substantially the specific throughput (reduced mass per unit time and unit volume of the reduction facilities needed for this), and thereby increasing the economic efficiency of this unavoidable pro al step for the powder metallurgical production of refractory metals. The quality of the powder prepared according to this procedure should approximately correspond to the standard attainable by known methods or even exceed it. In particular, this also affects the grain structure of the powder. The method should include the possibility of having several consecutively occurring reaction steps of the reduction occurring in one reaction chamber consecutively and/or simultaneously when required. Until now, these have occurred in two or more spatially or chronologically separated cycles for reasons of quality or cost.

DETAILED DESCRIPTION OF THE INVENTION

Figure 1:
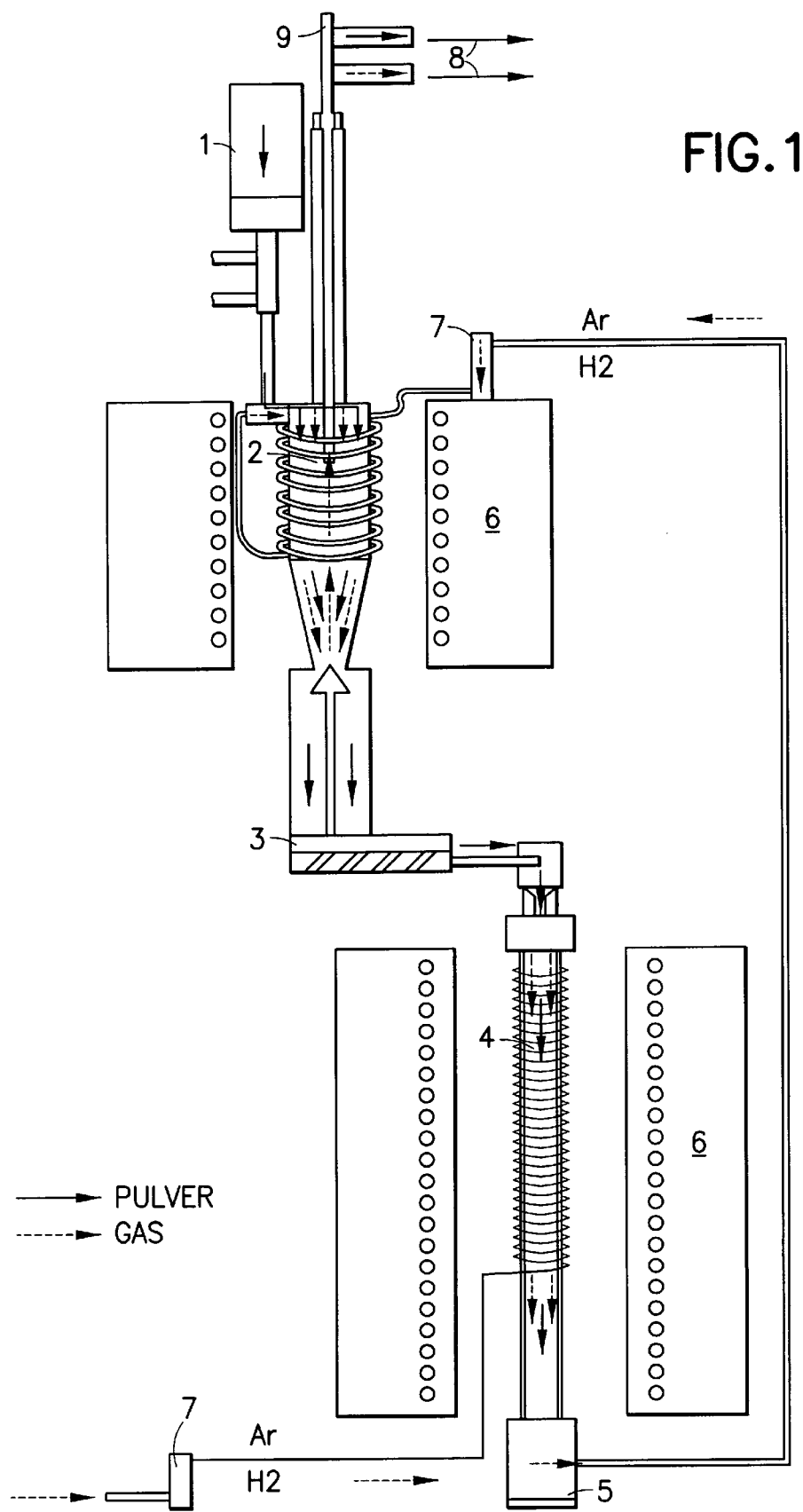
FIG. 1 illustrates a two-stage continuous process in two consecutive reaction chambers in accordance with the present invention.

Reaction chambers for carrying out the innovative method can be combined under the concept already described above, known to the specials as cyclone. Hence, what is common to the cyclones is the movement of the material to be reduced and of the gases participating in the procedure on defined paths in the chamber. The chambers generally have a shape which is rotationally symmetric, with a rotational axis that is approximately vertical. The chamber, for example, has a cylindrical shape which may optionally continue downward in the shape of a truncated cone. Chamber shapes similar to an electric hair dryer or a snail shell are also conceivable.

The material to be reduced, present in powdered form in accordance with the invention, can be a metallic oxide, e.g. $WO_3$, and will be reduced like this to metal powder in a one step reaction.

Other metallic compounds are reduced to metal powder over two or more reaction steps in accordance with the state of technology tested in practice. In these cases, the material is alternately reduced to powdered metal in two or more stages: a first stage of reduction in a first cyclone under appropriate reaction conditions, and in a second and, if necessary, another cyclone adapted to other reaction conditions.

Another alternative consists of the possibility of creating zones of different reduction conditions in a single cyclone, so that a first stage of reduction occurs in a first zone, which the material to be reduced is to pass through, and the further reduction to powdered metal occurs in a succeeding zone pass-through.

The process can then be repeated one or more times to increase the degree of purity of the desired end product in powdered form.

The concept of "chemical reduction" is not restricted in this invention to the transformation of metallic oxides of higher oxidation states to oxides of a lower oxidation stage. The concept of "chemical reduction", at least one of the atoms or ions of the material to be reduced decreases its oxidation number. Correspondingly, the powdered metallic compounds processed in accordance with the invention can be present in the form of carbides, nitrides, halides, solid acids, or metallates, for example ammonium para-tungstate.

To attain the short processing times, in accordance with the invention, as well as a sufficiently complete reduction, it is necessary, as before, to use powders for the material to be reduced, with particle sizes which can be produced economically yet be as small as possible. Particle sizes between 0.1 and 10 micrometers are common.

Besides the particle size and particle-size distribution of the material to be reduced, temperature, flow, degree of turbulence of the materials, and finally the construction of the reaction space itself have a decisive influence on the method and the quality of the reduced material. The optimization of these parameters for each individually aspired result depends on the ability of the specialist.

Important characteristics of the method's embodiments are described in the subclaims.

The actually attainable, short processing and dwelling times of 0.4 to 60 seconds in the reaction space are an essential advantage of the innovative method. A specific throughput, not previously considered possible, is thereby attained for the material to be reduced. The throughput measurement attained in practice lies near 1 ton per cubic meter reaction space and hour, or more. This result could not be predicted by the specialist.

In the known reduction methods, e.g. for refractory metal compounds, the moon and entry rate of the reducing gases to the grain surface of the powder which is present as bulk material, as well as the removal of reaction gases away from the powder's surface, determine the pace of the process and the total reduction time which is necessary. The specialist could therefore not obtain any valuable information from those methods, which would enable him to conclude that the method in accordance with the invention could produce a technically useful reduction in a period of seconds. He therefore had to assume instead the much higher reaction time on the basis of current experience.

Depending on the system, reaction in a cyclone means that the dwelling times of the reaction materials in the chambers are measured in seconds. This means that the known methods, currently conducted on an engineering scale in the cyclone, are restricted to reactions in which the reaction products that arise exist as gaseous materials because of the correspondingly high reaction temperatures. Therefore, if solids are processed as the material to be reduced, they will vaporize. The complete chemical transformation of powdered particles in a solid-gas reaction which retains the solid state, means comparatively long reaction times, however, also depending on the system.

This must deter the se from falling back on the cyclone method in the case above. The setting of the suitable processing parameters in question in a cyclone, for a method in accordance with the present invention, can be done at the level of a skilled tradesman.

One advantage for the innovative method which is more significant and unexpected at this scale, consists of the appearance of different phases—intermediate sates within a powdered grain (internally, externally) during the reaction event, which let the pin explode, increasing the powder's surface, and thereby offering, to the reducing gas in the cyclone, a continuous reduction-working ace which rapidly becomes larger along the path of the particles.

The specialist may assume that heat exchange takes place between the cyclone-reaction wall, the gas, and the powdered material as the material to be reduced moves through the reaction space. The high heat transfer actually attainable was nevertheless surprising and represents an additional unexpected advantage for attaining the goal of an essentially complete reduction of powdered particles in a solid state within the short process-related dwelling times in the reaction space.

In addition to the economic advantages of the innovative method, there is also an improvement in quality for the desired end product. Powdered metals, produced according to the powdered metallic oxide-reduction methods usually used today, in pusher-type furnaces and under the reaction conditions which exist there for example, have a noticeable increase in grain compared to the original powdered grain size. With the innovative method, however a significant decrease in particle size occurs as shown above.

In accordance with an advantageous embodiment of the innovative method, the material to be reduced is first introduced into a reaction chamber's first zone, in which high absolute and high relative speeds for the gaseous and solid powdered components exist together. Accordingly, the exchange rates and the frequency of exchange of the reactants on the surface of the powder to be reduced will be high in this zone. By appropriate control of the gas flows, as well as the introduction and removal of reaction gases, only a comparatively low speed of the powder to be reduced is employed in an adjacent zone of the reaction chamber. This results in the desired higher dwelling time of the residue of the material to be reduced in the chamber. Because the reduced portion of powdered grain grows comparatively rapidly in the staring phase of the reduction and a higher exchange of oxygen occurs on the particle surfaces, additional reduction is decreased naturally due to the more advanced transformation which already exists. The material to be reduced is located in a type of pressure tube. Even powder which is largely reduced can be converted according to the technology of the invented method, in one phase with a very high reduction portion, 99% or better, for example.

Example 1

Tungsten oxide blue, $W_4O_{11}$, is reduced in a two-stage continuous process in two consecutive reaction chambers both of the cyclone type, in accordance with the drawing of the principle in FIG. 1. In the first stage of the process, there already occurs a reaction of more than 90% of the material to be reduced into tungsten metal powder. The purity of the powder attainable in this way with economical process control, usually characterized by the content of oxygen residue in the powdered metal, is nevertheless insufficient for many applications of powder metallurgy. The process is therefore repeated, appropriately adapted to the changed reaction conditions (little residual oxygen) with partially changed process parameters.

In the first stage of the process, $W_4O_{11}$, as the material to be reduced, and the reaction/inert gas mixture are intensively mixed by common introduction into the reaction chamber, and pass through the chamber on prescribed paths in a turbulent flow. In the second process stage, in contrast, the reaction gas and the powder obtained by the first process are entered into the reaction chamber separately in such a way, that powder and gas pass downwards through the chamber in laminar flow.

In the first stage of the process, powdered $W_4O_{11}$, together with a preheated mixture of $H_2$ and argon, is blown separately over a feeder (1) into the head portion of a reaction chamber (2), which is approximately rotationally symmetric to the direction of fall. The reaction/inert gas mixture is metered by a flow meter (7). The reaction chamber has a heating device (6). The powdered reaction product leaves the chamber at the lower end, fills into a storage with a conveying screw (3), which feeds it into a second reaction chamber (4) with a heating device (6). The exhaust gas (8), $H_2$, $H_2O$ and inert gas, leave the first chamber at its head part.

In the second stage of the process, both the reacted material, which is highly purified tungsten powder, and also the exhaust gases, exit at the lower end of the tubular chamber, which is arranged vertically. The powdered tungsten is collected into a container (5). The temperature control of the entire two-stage process occurs through a thermocouple (9) at the first reaction chamber's exhaust gas outlet.

The first stage's process parameters are amount of powder of the material to be reduced, $W_4O_{11}$ blue, 700 g/h reducing gas, including the inert gas portion, 6000 l/h cyclone chamber temperature, 1100° C.

average dwelling time of the powder to be reduced in the first chamber, 5 seconds reduction rate 95%, oxygen residue content of the reduced material 9980 micro grams/g.

The process parameters of the second stage are powder throughput 370 g/h gas quantity as a mixture of reducing gas $H_2$ and inert gas, 4000 l/h cyclone temperature 1100° C.

oxygen residue content of the reduced tungsten powder, 780 micrograms/gram=99.6% W average dwelling time of the powder to be reduced in the second chamber, 7.5 seconds.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used as terms of description and not terms of limitation. There is no intention to use the terms or expressions to exclude any equivalents of features shown and described or portions thereof and this invention should be defined in accordance with the claims which follow.

what is claimed:

1. A process for the chemical reduction, consisting of one or more stages of reaction, of powdered metal compounds as a material to be reduced, to powdered metal in a temperature controlled reaction chamber with input and output openings for the material to be reduced, for a gaseous reducing medium and optionally for a carrier gas, comprising the steps of continuously introducing the powdered material to be reduced into the chamber, traversing the chamber during the course of thermochemical reactions and while retaining the solid phase on paths through the chamber for an average duration of 0.4 to 60 seconds, wherein the paths of the material to be reduced are at a relatively high flow rate in a tangential direction to a wall of the reaction chamber as compared to flow rates in axial and radial directions to the chamber wall, the paths being determined by at least flight direction and speed of material upon entry or by the flow parameters of the gas upon entry, and wherein the material is reduced with at least 90% completeness to the powdered metal.

2. The process for the chemical reduction of powdered metal compounds according to claim 1, further comprising the step of maintaining the temperature necessary for the reduction within the reaction chamber by heating/cooling the chamber from outside.

3. The process for the reduction of powdered metal compounds according to claim 1, further comprising the step of maintaining the temperature necessary for the reduction within the reaction chamber by heating/cooling the material to be reduced, the gaseous reducing medium and/or the carrier gas before entry into the reaction chamber.

4. The process for the reduction of powdered metal compounds according to claim 1, wherein the paths of the material to be reduced and the flow of the gas are prescribed by a rotationally symmetric arrangement of the reaction chamber relative to a vertical rotational axis.

5. The process for the reduction of powdered metal compounds according to claim 1, further comprising the step of passing the material introduced into the reaction chamber through consecutive individual zones of different temperature, gas flow parameters, reduction media or carrier gases.

6. The process for the reduction of powdered metal compounds according to claim 1, wherein refractory metal compounds are used as the material to be reduced.

7. The process for the reduction of powdered metal compounds according to claim 1, wherein molybdenum oxide powder ($MoO_2$) is used as the material to be reduced and $H_2$ gas is used as the reducing medium.

8. The process for the reduction of powdered metal compounds according to claim 1, wherein tungsten blue oxide powder ($W_4O_{11}$) is used as the material to be reduced.

9. The process for the reduction of powdered metal compounds according to claim 8, wherein the material to be reduced is converted into tungsten powder with an oxygen residue content smaller than 1000 ppm.

10. The process for the reduction of powdered metal compounds according to claim 1, wherein an average dwelling time in the reaction chamber of the material to be reduced lies between 0.4 and 30 seconds.

11. The process for the reduction of powdered metal compounds according to claim 1, wherein an average dwelling time in the reaction chamber of the material to be reduced lies between 0.4 and 10 seconds.

12. The process for the reduction of powdered metal compounds according to claim 1, wherein the powdered metal is attained with at least 99% completeness.

* * * * *